UNITED STATES PATENT OFFICE.

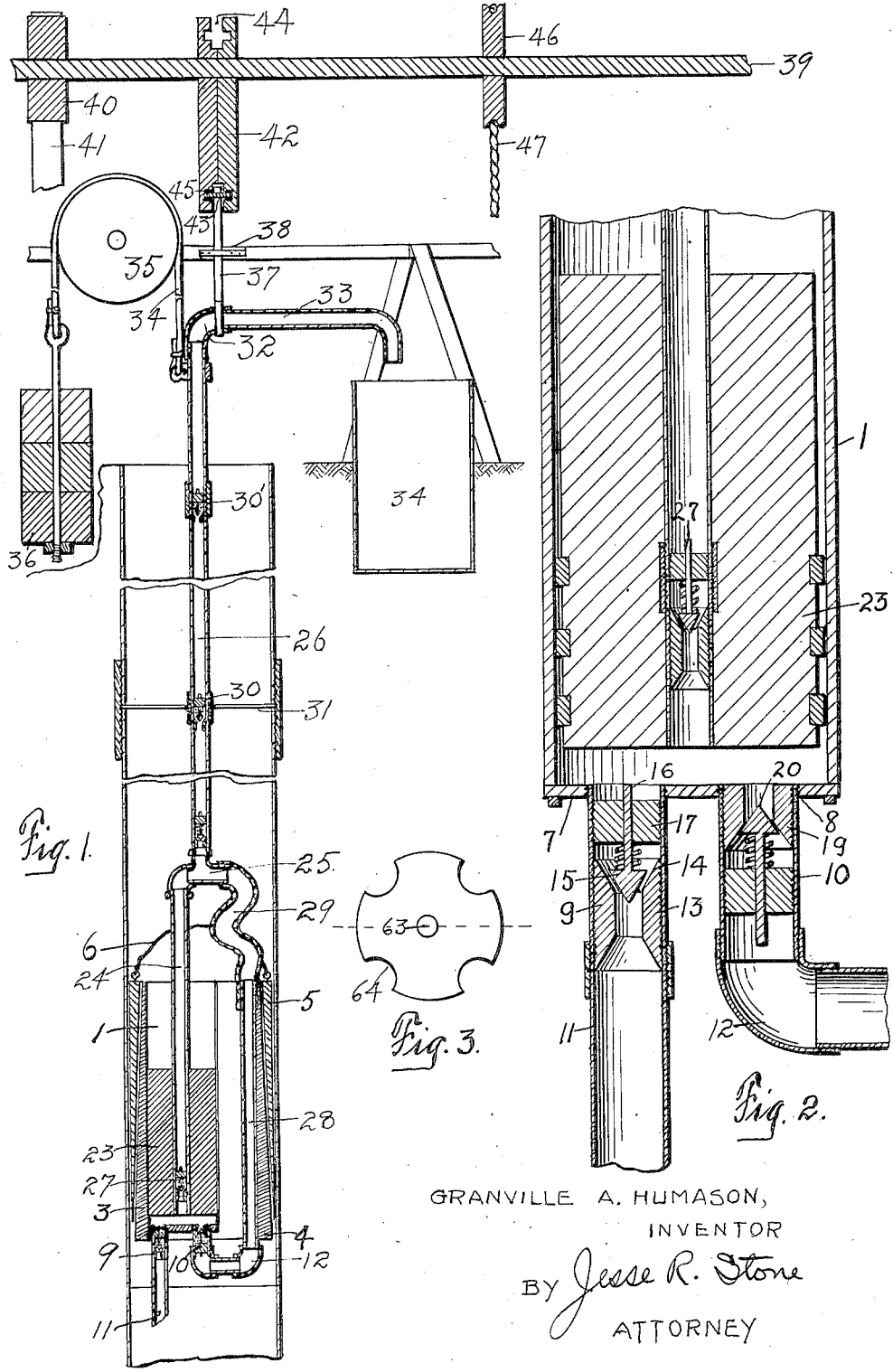

GRANVILLE A. HUMASON, OF HOUSTON, TEXAS, ASSIGNOR OF ONE-HALF TO JOHN W. PARKER, OF HOUSTON, TEXAS.

PUMP.

1,326,508.  Specification of Letters Patent.  Patented Dec. 30, 1919.

Application filed June 25, 1918. Serial No. 241,778.

*To all whom it may concern:*

Be it known that I, GRANVILLE A. HUMASON, a citizen of the United States, residing at Houston, Harris county, Texas, have invented a certain new and useful Improvement in Pumps, of which the following is a full, clear, and exact description, such as will enable others skilled in the art to which it appertains to make and use the same.

My invention relates to an improvement in pumps and has particular reference to pumps of the reciprocating type for use where considerable power is required.

One object of my invention is to provide a pump which will be adaptable for many different uses but which will be simple and durable in structure and powerful in operation.

Another object is to provide means for operating the piston of my reciprocating pump which is easy to adjust upon a rotating shaft and which will be especially efficient in operation.

Another object is to secure a pump which will be capable of operation for deep well pumping and which may be readily secured in position in the well and again released when desired.

Other objects and advantages will be readily apparent to one skilled in the art from the detailed description which follows and the same will be set forth with more particularity in the claims.

In the drawing wherein I have illustrated various applications of my invention to different uses, and wherein like numerals of reference are applied to like parts throughout the several views; Figure 1 is a longitudinal vertical section of my apparatus as applied to deep well operations: Fig. 2 is an enlarged view of a longitudinal central section through my improved pump cylinder and showing one form of valve which I may use in my device; Fig. 3 is an end view of my valve stem guide.

In Figs. 1 to 3 I have shown my invention in use in deep well pumping. In this embodiment the pump cylinder 1 is secured in a housing 3 approximately cylindrical in shape the walls of which are slightly thicker at the base, than at the top, as shown at 4. Outside this housing are two arcuate wedge-shaped plates 5, 5, adapted to wedge the housing 3 in place inside the casing 2. The two wedges 5, 5, are connected together at their upper ends by a wire rope or cable 6 by means of which they may be removed and thus release the cylinder housing 3 from the well hole.

The cylinder fits closely against one side of said housing and is provided with two threaded openings 8 in the cylinder head 7 into which are threaded valve chambers 9 and 10, said chambers being secured at their outer ends to inlet and outlet pipes 11 and 12 respectively. The valve chamber 9 has the wall thickened at 13 on its outer end and the inner face of said wall is beveled at 14 to provide a seat for the conical valve 15. Said valve is provided with a stem 16 slidable in a guide 17 and held resiliently toward said seat by a helical spring 18 placed around said stem and seated between the guide 17 and the valve head 15.

The guide 17 is a cylindrical block adapted to be threaded into the valve chamber. Said block is solid except for a central opening 63, through which the valve stem is slidable, and except for longitudinal grooves 64 in the periphery thereof. These grooves 64 serve as a passageway for the liquid through the valve chamber.

The outlet valve chamber 10 has a similar valve seat 19 and valve 20 mounted in a guide 21 and held in its seat by the spring 22. The valve 20 is placed in reverse direction from valve 15 and is adapted to open outwardly to allow exit for water or other liquid forced out by the pump piston.

The piston 23 is adapted to reciprocate within the cylinder 1 and is attached at the lower end of the hollow piston rod 24, the said piston rod 24 being a hollow pipe and connected at its upper end to a T-union 25 at the lower end of the pump rod 26. The piston rod 24 extends entirely through the piston head 23 and has within the piston head an upwardly opening valve 27, similar in structure to the valve chambers 9 and 10, previously described. The outlet pipe 12, leading from the cylinder, is turned back on itself and is extended upwardly at 28 to the top of the cylinder housing 3. Between the top of the outlet pipe 28 and the T-union 25 I have connected a piece of flexible rubber hose 29. This hose is of a length sufficient to accommodate a play between the pump rod and the end of the pipe 28 equal to the length of the stroke of the pump rod 26 and the piston 23.

The hollow pump rod 26 is provided at different elevations throughout its length with separate upwardly opening valves 30, 30', etc., sufficient in number to retain the head of the water standing in the pipe 26 and thus prevents the back pressure of the complete column of water therein upon the lower operating parts of the pump. The pump rod is furnished with guides extending across the casing in which the same is adapted to reciprocate. These guides 31 are disk shaped and of a diameter equal to that of the well casing and are adapted to be seated between the ends of the separate lengths of casing pipe used in retaining the walls of the hole. At the upper end of the reciprocating pump rod 26 I have shown an elbow 32 connected to a horizontal pipe 33 through which the liquid is discharged in the tank represented diagrammatically at 34. Secured under the elbow 32 is a wire cable 34' passing over a pulley 35 and on the lower end of which are placed adjustable weights 36 sufficient to counterbalance the weight of the pump rod 26.

The pump rod 26 is reciprocated by means of a novel arrangement. The connected rod 37 is attached to the pump rod at the elbow 32 and extends upwardly through a guide 38 through which it is adapted to reciprocate. The power shaft 39 is supported in any convenient way in the pump derrick. Mounted upon this shaft is a pulley 40 connected to any source of power by means of the belt 41. Upon the shaft 39 I have mounted an adjustable eccentric pulley 42. This pulley has a peripheral groove 44 therein adapted to receive the end of the connecting rod 37 and the cross pin 43 thereon. This pulley 42 is constructed in two sections adapted to be fitted together along their inner faces to make up the complete structure. Upon the ends of the pin 43, fitting within the peripheral groove 44, are small rollers 45 upon which the pin 43 is adapted to roll within the said groove. It will thus be noted that when the eccentric pulley 42 is rotated, by means of the shaft 39, the connecting rod 37 will be given a reciprocating movement within the guide 38 equal to the power stroke of the cam. This means of operation of the connecting rod 37 has been found to be especially efficient. On the downward stroke of the pump rod, an especially powerful lift is obtained, there being a wedging action between the pump rod and the power shaft 39, due to the eccentric mounting of the pulley 42. On the shaft 39 I have also shown a pulley 46 adapted to communicate power from the shaft 39 to a neighboring pump derrick by means of the cable 47 thereon.

The operation of this pump will now be obvious. A rotation of the shaft 39 will, through means of the eccentric pulley 42 and the connecting rod 37, operate to reciprocate the pump rod 26. The movement of this pump rod is communicated through the piston rod 24 to the piston 23. On the upstroke of the piston, oil or water will be drawn in through the inlet pipe 11 and the valve chamber 9 to the cylinder and on this stroke the valve 20 on the outlet pipe will be drawn firmly into its seat thus preventing any back-flow from the outlet pipe into the cylinder. The valve 27 within the piston head will also be seated in such manner as to prevent any back-flow from above through the piston rod 24.

On the downward stroke of the piston the liquid in the cylinder will be forced either upwardly through the piston head 23 and the hollow piston rod 24 or outwardly past the valve 20 and through the upwardly extending pipe 28 and the hose 29 to the pump rod 26. The provision of the two outlet valves 20 and 27 for the liquid makes it practically impossible for an outlet valve to become clogged. The failure of one of the valves to open properly will be counteracted by the full opening of the other valve allowing the liquid to take the upward path most easily effected. The valves 30, 30' in the pump rod 26 will serve to prevent back pressure upon the pump but because of their position in the pump rod will allow the upward passage of fluid therein with very little resistance. The weight of the heavy body of fluid within the pump rod,—such as is common in deep wells in the oil fields— will be counter-balanced by the weights 36, as previously described.

Having thus described my invention, the advantages and objects of which will be apparent without further description, what I claim as new and desire to protect by Letters Patent is:

1. In a pump, a cylinder, a piston therein, inlet and outlet valve-controlled pipes fixed in one end of said cylinder, a hollow pump rod secured to and passing through said piston, a valve in said pump rod adapted to allow passage of liquid upwardly through said piston, a T-union in said pump rod above said cylinder and a flexible connection between said outlet pipe and said pump rod so that liquid may be forced up either through the piston or said outlet pipe to said pump rod.

2. In a pump, a cylindrical housing, a pump cylinder therein, a reciprocating piston in said cylinder, inlet and outlet valve-controlled pipes in the lower end of said pump cylinder, the outlet pipe being directed upwardly to the top of said housing, a hollow pump rod extending completely through said piston valves in said pipe, a T-union in said rod above said housing and a flexible hose connection between said union and said outlet pipe.

3. In a pump, a cylinder, a solid piston reciprocatable therein, a hollow piston rod extending through said piston, a plurality of upwardly opening valves in said rod, inlet and outlet pipes in the lower end of said cylinder, and a flexible connection between said outlet pipe and said rod above said cylinder.

4. In a pump, a cylinder, a piston therein, a hollow pump rod extending through said piston, said piston being otherwise solid, a valve in said rod, inlet and outlet pipes on the lower end of said cylinder, automatic valves in said pipes, said outlet pipe being connected with said pump rod above said cylinder.

5. In a pump, a cylinder, a piston reciprocable therein, a hollow piston rod extending through said piston, a valve in said rod, inlet and outlet pipes connected with the lower end of said cylinder, said outlet pipe connected with said hollow pump rod above said piston.

6. In a pump, a cylinder, a piston therein, inlet and outlet pipes in the lower end of said cylinder, automatic valves in said pipes, a hollow pump rod on said piston, and extending completely through the same, a T-union in said pump rod above said piston and a flexible hose connection between said outlet pipe at the end of said cylinder and said union above said piston.

7. In a pump, a cylinder, a piston, solid except for a central valve-controlled passage therethrough, inlet and outlet valve-controlled pipes leading from one end of said cylinder, a hollow pump rod on said piston, and a flexible water pipe connecting said outlet pipe and said hollow pump rod above said piston.

8. In a pump, a cylindrical housing adapted to be seated in a well, a pump cylinder therein, a piston in said cylinder, a hollow pump rod extending completely through said piston and adapted to furnish a passage therethrough for the fluid being pumped, valves in said rod and means for wedging said housing in position in the well comprising arc-shaped wedge plates adapted to be driven downwardly between said housing and the walls of the well.

In testimony whereof, I hereunto affix my signature this the 22nd day of June, 1918.

GRANVILLE A. HUMASON.